United States Patent [19]
Fixot

[11] 3,911,728
[45] Oct. 14, 1975

[54] COAGULATION DETECTION APPARATUS

[75] Inventor: Marcel Joseph Fixot, L'Hermitage, France

[73] Assignee: Etablissements Daillet S.A., Rennes, France

[22] Filed: Feb. 7, 1974

[21] Appl. No.: 440,282

[30] Foreign Application Priority Data
Feb. 19, 1973    France .............................. 73.05788

[52] U.S. Cl. ...................................... 73/55; 73/64.1
[51] Int. Cl.[2] ......................................... G01N 11/04
[58] Field of Search .................. 73/54, 55, 56, 64.1; 23/230 B

[56] References Cited
UNITED STATES PATENTS

| | | | |
|---|---|---|---|
| 2,503,660 | 4/1950 | Exline et al. | 73/56 |
| 2,503,676 | 4/1950 | Marusov | 73/55 |
| 3,443,419 | 5/1969 | Gruitroy et al. | 73/64.1 |
| 3,463,614 | 8/1969 | Leslie | 23/230 B |
| 3,486,859 | 12/1969 | Greiner et al. | 73/64.1 X |
| 3,635,678 | 1/1972 | Seitz et al. | 73/64.1 X |
| 3,766,774 | 10/1973 | Clark | 73/64.1 |

Primary Examiner—Richard C. Queisser
Assistant Examiner—Joseph W. Roskos
Attorney, Agent, or Firm—Laff, Whitesel & Rockman

[57] ABSTRACT

The invention relates to a process for detecting fluid viscosity increase, and more particularly for a fluid having a suddenly and substantially increasing viscosity, such as blood plasma. The process comprises moving fluid to-and-fro through a narrow cross-section tube or a tube portion and detecting when such a movement is slowed or stopped due to a sudden viscosity increase.

12 Claims, 8 Drawing Figures

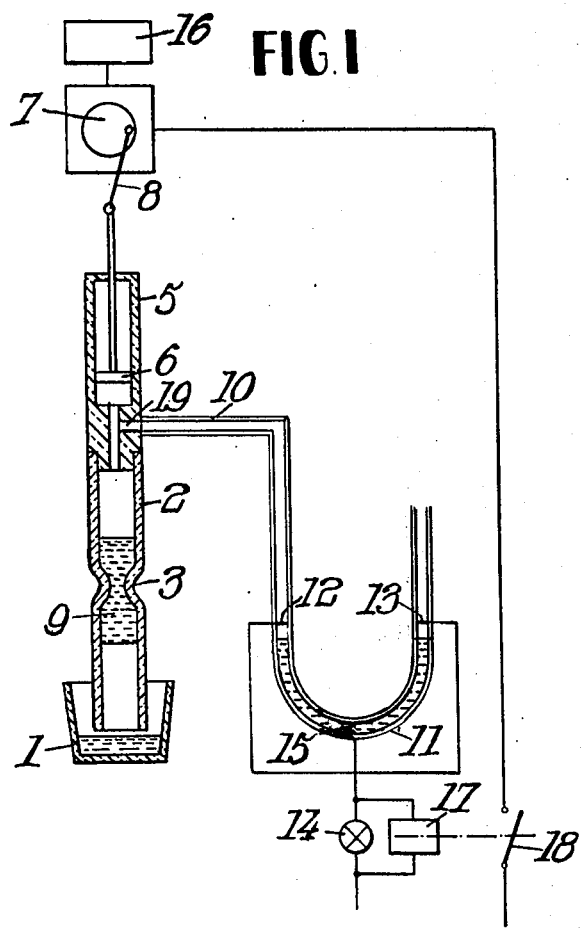
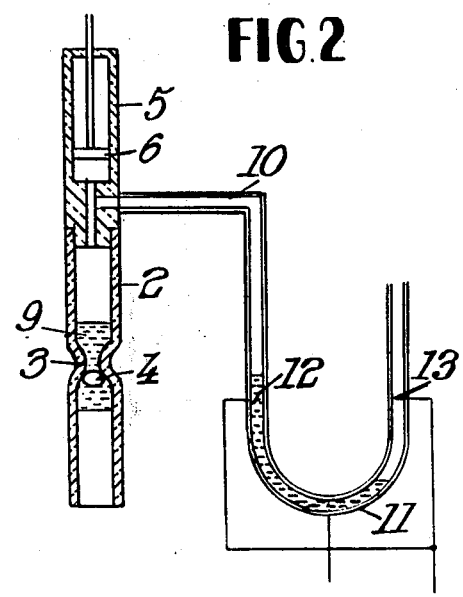
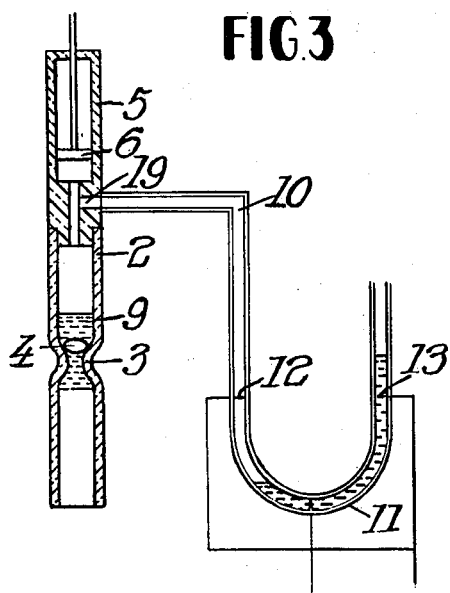
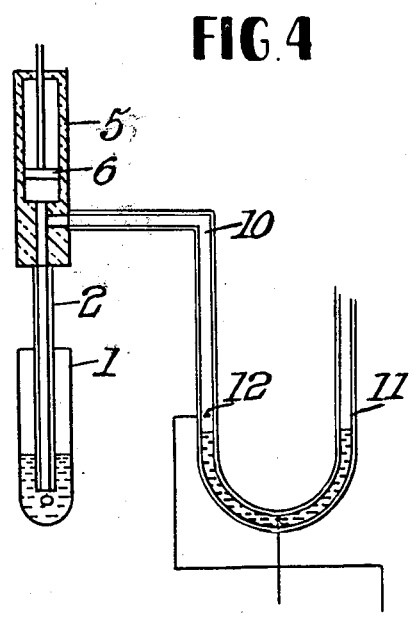

COAGULATION DETECTION APPARATUS

The present invention relates to processes and apparatus for measuring fluid viscosity variations and more particularly for detecting in a predetermined liquid substance the changes either from the viscous condition $V_1$ to the more viscous condition $V_2$, or from the liquid condition to the solid condition. In particular it relates to hematology when measurements relate to the time interval at the end of which blood coagulates.

In this respect, it will be recalled that mostly in applications of this type, particularly in those applications which have just been mentioned, coagulation time is manually measured in a test tube wherein a volume of blood plasma has, for instance, been poured. Then a coagulation modifier, such as thromboplastin in particular, is added thereto. The mixture is maintained at a temperature of about 37°C and is agitated to produce a clot. Elapsed time from the operation beginning $t_1$ to the operation end $t_2$ is either the coagulation time to be measured or a value which depends on such a coagulation time.

A purpose of this invention is to perform those operation in an automatic manner and to provide a process wherein a column of the substance to be measured is introduced at operation beginning time $t_1$. This introduction is into a suitable tube having one end connected to a pumping device capable of causing the column to move in a to-and-fro motion within the said tube. The viscosity change time, particularly the coagulation time, is detected by sensing either pressure increase or decrease, resulting at this time in the pumping operation.

In particular a gas mixture, mainly air, separates the column from the operative means (piston, etc.) of the pumping device and the pressure changes produced in that medium are detected at the viscosity change time.

In carrying on such a process in the invention a sample tube having a suitably sized cross-section area is connected to a syringue having piston which is movable either manually or by means of a motor in a to-and-fro motion, the input/output room of the syringe pump being connected to a pressure detector device. Of course the syringe may be replaced by any other suitable device, for instance comprising a membrane.

The sample tube may have a portion with a narrower cross-section that causes the clot to be more easily formed at the coagulation time.

The pressure detector device may be arranged in any suitable manner and in particular constituted by an U-shaped mercury tube combined with two electric contacts. Each electric contact is located in a branch of the U-shaped mercury tube at a suitable distance from the mercury surface level. When the device is at rest, either one of those electric contacts contact the mercury surface and consequently close an elctric circuit at the time when the coagulation or viscosity increase causes either a pressure increase or a pressure decrease depending on either the delivery pump condition or the sucking pump condition, respectively.

In addition the apparatus may comprise time measuring devices which are suitably combined with pressure measuring devices.

It is also to be noted that means are advantageously provided for removing the sample tube at each measurement operation and for inserting another one. Those means, for instance, comprising a turret capable to perform a tube insertion, to fit the tube to the measurement apparatus and to eject the tube according to its various successive positions.

Other features of the present invention will appear more clearly from the following description of several embodiments, the said description being made in conjunction with the accompanying drawings, wherein:

FIG. 1 is a cross-sectional vertical view of an apparatus for measuring blood plasma coagulation time interval according to this invention;

FIGS. 2 and 3 show the apparatus of FIG. 1 in two different operation steps;

FIG. 4 shows an alternative of the embodiment shown in FIG. 1;

Figure 5:
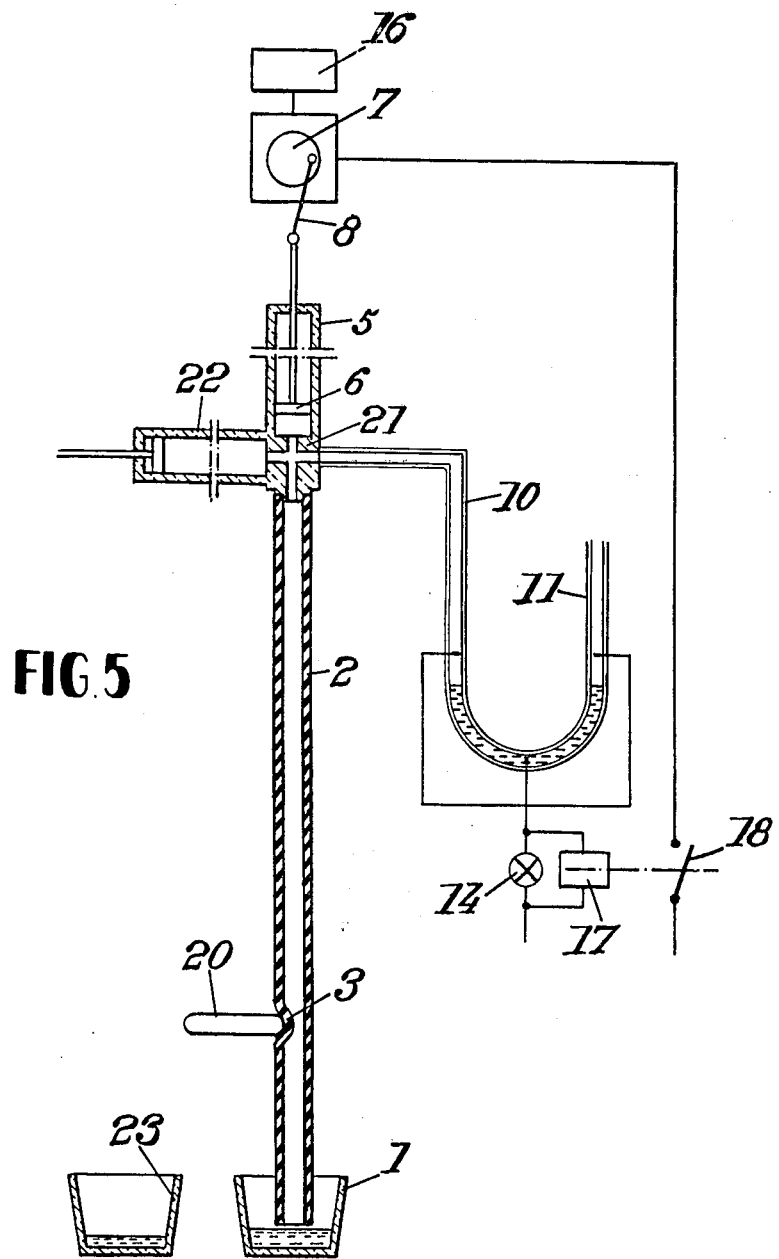
Figure 6:
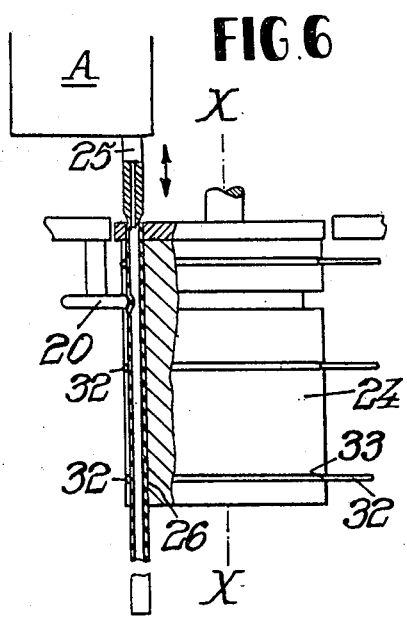
Figure 7:
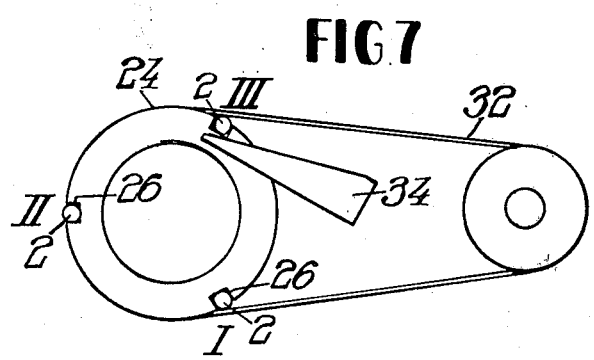
Figure 8:
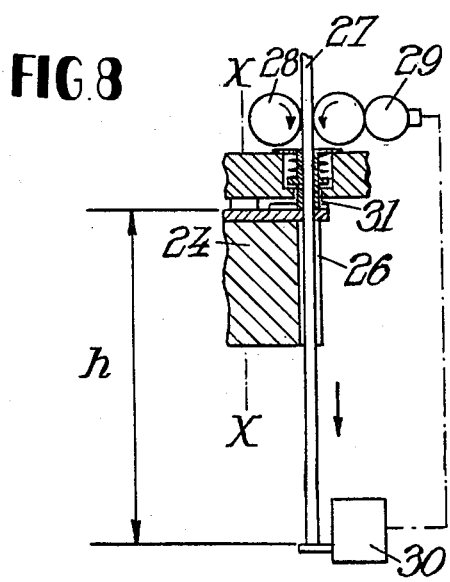

FIG. 5 still shows another alternative of the embodiment shown in FIG. 1;

FIGS. 6 and 7 respectively show a plane view and an elevation view of a turret feeding system capable to replacing the sample tubes after measurement operation; and FIG. 8 is a vertical cross-sectional view of a device for cutting sample tubes from as great length tube, such a device being combined with the apparatus according to this invention.

Reference will be hereafter particularly made to a process and apparatus particularly fitted to measure blood plasma coagulation time interval. However, the processes and apparatus according to this invention are not limited to such an application.

From a cup 1, FIG. 1, wherein blood plasma and thromboplastin have been introduced at the beginning of the operations, that mixture or a portion of that mixture is drawn up into at least a tube having a suitable reduced cross-section area in using pneumatic means. That is a pumping device provides and maintains a gas medium - mainly air - between that pumping device and the drawn mixture column. Then such a pumping device or any other device combined with it is operated to perform a sequency of lifting and forcing motions in order to produce upward and downward motions of the mixture column through the tube. These operations are combined with operation of means for detecting pressure variations in the gas column between the liquid column and the pumping device.

Indeed, as it is convenient to so design the tube, if the passage cross-section area inside the above mentioned tube or a portion of the said tube is narrow enough the coagulation, that is the development of a clot, results in an increased loss of pressure that causes an abrupt pressure change in the gas column. Such a change is an increase when the pumping device is in a forcing condition or a decrease when it is being in lifting condition, the pressure change being immediately registered.

Thus, the coagulation time interval is the time interval, $t_2 - t_1$, measured from time $t_1$, indicating the beginning of the operations to the time $t_2$, when the abrupt pressure change is registered.

Obviously means are provided to accurately store time $t_2$.

In the embodiment as shown in FIG. 1 the tube 2 is for instance made of glass or a plastic material and has a portion provided with a narrower cross-section 3 which may cooperate in developing a clot as shown in FIGS. 2 and 3, as it will be hereafter described. Tube 2 is removably mounted at the bottom of the pumping device that may be a simple syringe 5 provided with a piston 6.

To-and-fro motions of piston 6 produces successive upward and downward motions of blood plasma 9, which could also be manually produced. The piston backward or return motion is produced by a spring. However, it appears preferable to utilize a motor 7 for driving piston 6 by means of a system 8 comprising a connecting-rod and a crank. Motor 7 is started at operation beginning time $t_1$ and automatically stopped at the clothing time $t_2$.

For measuring the gas column pressure of the gas column located between plasma 9 and 5, there is provided, as shown in FIG. 1, a pipe 10 connected from the bottom of syringe 5, at 19, to a pressure metering device 11. Pipe 10 has a U-shaped tube containing mercury or another liquid, metering device 11 including means for detecting movements of liquid surface levels in the U-shaped tube.

The detecting means may be pins 12 and 13 located a certain distance over mercury surface levels, when the device is at rest in a balanced condition. Either pin 12 or 13 can, when contacting mercury, close the electric circuit of an alarm device, a register or another device, for instance a lamp 14 which is assumed to be connected either to mercury bottom or grounded at 15.

Obviously that overpressure or underpressure measuring device may be embodied in any other manner. Thus any pressure transducer may be used which can open or close an electric circuit, such as a minimum-maximum manometer for instance. The electric circuit may also be opened or closed by a microswitch supported by the syringe piston, such a microswitch being responsive to overpressure and underpressure to be detected.

Regarding the means for indicating times $t_1$ and $t_2$ they may be designed in various manners.

Thus, at time $t_1$ that preferably coincides substantially with the mixing of plasma and thromboplastin, an initiating pulse may turn syringe driving motor 7. This motor may in turn drive a counter 16 or a similar electronic counting system, or a time registering tape mounted on a suitable printing machine. A separate synchronous motor may also be used which would drive such a counter or a similar registering device.

Concerning time $t_1$, either operation of the corresponding switch 12 or 13 will, for instance operate a relay 17, FIG. 1, that can turn off motor 7 driving counter 16 or any other register system, via s switch 18.

The operation of the above considered apparatus will now be described as follows.

When motor operating piston 6 in syringe 5 is cyclically moved downward by and upward by, thus moving the mixture (plasma plus thromboplastin) column accordingly.

At the beginning of the operation there is no result since piston 6 either moves downwardly or upwardly and does not vary the pressure by a value which is high enough to move mercury, which contacts neither pin 12 nor pin 13.

But as soon as a clot 4 is produced piston 6 is either moved downward or upward, and vary the pressure by a value which is high enough to move mercury to make either contact with pin 12 or pin 13 as it will be explained in conjunction with FIGS. 2 and 3.

FIG. 2 illustrates the case of a clot growing under the narrow portion 3. When piston 6 is moved upward by, it causes the pressure to substantially decrease which moves mercury leftward by where it contacts pin 12.

Lamp 14 is lit and relay 17 turns off motor 7 off as well as the time counter which is indicating time $t_2$. Thus time interval $t_2 - t_1$ can be measured in a simple manner.

FIG. 3 illustrates the case of a clot growing above the narrow portion 3. When piston 6 is moved downward by, it causes the pressure to substantially increase which moves mercury rightward by where it contacts pin 13. The end of the operation is substantially identical, to that which has just been described.

It is to be noted that, in certain cases, a narrow portion such as 3, FIG. 1, may be avoided provided that the sample tube has a sufficiently narrow inside cross-section area so as not to pose a clot.

Such an alternative is illustrated in FIG. 4.

In this case clot 4 is only active when the syringe piston 6 is moved upward by. The expected results is still produced, but with less accuracy, since measurement accuracy varies as a function of the alternating motion rate of syringe piston 6. Thus if for instance, piston motion frequency is of 1 Hz, in the embodiment shown in FIGS. 1–3, it is possible to detect a coagulation condition every half second while using the embodiment shown in FIG. 4 a coagulation condition may only be detected every second.

In another arrangement according to this invention two separate syringe are used in combination with a single sample tube, the first syringe being used for first pumping up the product, particularly the mixture of plasma and coagulation modifier (or another product) into the sample tube and the second syringe providing the to-and-fro motion.

Such an arrangement is advantageous when measurements are to be made on very small quantities such as for instance:

0.1 cm$^3$ of plasma, and
0.2 cm$^3$ of thromboplastin, so as to constitute a mixture of 0.3 cm$^3$ to be moved to-and-fro during the processing.

In the embodiment, as shown in FIG. 5, corresponding to this arrangement, the flexible sample tube 2 may be distorted so as to modify the cross-section area of the narrow portion 3 by means of a roller or cam 20.

In FIG. 5, tube 2 is assumed to be removably secured to the base 21 of an assembly comprising:

on the one hand, a first, syringe 22 will be used, as hereafter described, to pump up the mixture of plasma and thromboplastin, and on the other hand, the already mentioned syringe 5, is used in the base 21, further communicating with pipe 10 toward pressure meter 11.

Considering by way of example the processing of the above mentioned mixture of 0.3 cm$^3$, 0.1 cm$^3$ of plasma will first be pumped from a cup 23 into tube 2 by means of syringe 22 (controlled manually or by a motor); then the plasma sample is moved back into the cup 1 already containing 0.2 cm$^3$ of thromboplastin by means of the same syringe 22. Finally the mixture will be again pumped up from cup 1 into tube 2.

Then the processing will be only performed by means of syringe 5 according to the previously described process.

By way of example, for processing such a mixture of 0.3 cm$^3$ tube 2 will have an inside diameter of 2.5 mm and a length of 75 mm.

In another alternative, the two syringes 22 and 5 may be separately connected to a small pipe connected, on the one hand, to a union secured to the sample tube 2 and, on the other hand, to the pressure meter 11.

Sample tubes are preferably removed after each completed measurement so as to never contaminate the syringe(s).

In this respect, a kind of turret may be used which has several operation positions so as to be above to receive a new tube, to connect it to the measurement apparatus, then to remove it once the measurement is completed.

Advantageously, the new tube is cut on the turret from a long tube feeding the machine (in particular when the said tube is made of a plastic material), such a long tube being delivered from a coil.

By way of example FIG. 6–8 illustrate such a turret system provided for feeding the measurement apparatus with sample tubes.

Tubes 2 are moved one by one by a turret 24 rotatable about an axis X—X, FIG. 6, so as to locate them in register with the end of an union 25 connected to the syringe 5 or to a similar device which is part of the viscosity measuring apparatus schematically shown at A in FIG. 6.

Turret 24 is arranged as a drum having three grooves on its external surface. These grooves are parallel to axis X—X and convenient for receiving sample tubes, those grooves being angularly spaced by 120° from each other.

At a predetermined time, at station I, a sample tube is inserted into one of the grooves (station I, FIG. 7) a second tube, that has been previously inserted at station I, is located in the second groove at station II where it is to be connected to union 25 to make a measurement possible. Finally a third tube, wherein a measurement has just been completed, is in condition for being ejected from the third groove at station III.

Turret 24 is driven step by step, each step being of 120°.

At station I, there is provided a cutting device for cutting the desired tube portion from a continuous tube 27. In FIG. 8, assumption has been made that such a cutting device comprised for instance driving rollers 28 controlled by a motor 29, which are together located over and in register with the corresponding turret groove 26 and which work in combination with stopping means, turning motor 29 off when the length h of the sample tube has been uncoiled. Those stopping means comprise for instance a finger 30 the motor 29 when it is pushed by the bottom end of the sample tube inserted into the groove 26. At that time, or just later, a cutting device or guillotine 31 cuts the tube portion of length h. The assembly may be so arranged that finger 30 causes both motor 29 to stop and turret 24 to rotate to move tube 2 from station I to station II, such a rotation beginning with cutting the tube 2 in 31.

Step-by-step turret operation may be controlled in any suitable manner, for example, by a motor acting through cables or wires 32 located in circular grooves 33 provided at the turret surface. In the embodiment, as shown in FIG. 7, wires 32 cause tube 2 to be firmly maintained against turret 24 particularly at station II, but do not contact tubes being at stations I and III.

However, the only purpose of wires 32 may be to support tube 2 at station II, step-by-step turret operation being controlled by other means.

At station II union 25 is combined with suitable means so as to be moved in the direction parallel to turret axis. Downward motion of union 25 may be controlled by a cam to insert the union nose into the upper end of tube 2 while upward motion is controlled by a return spring.

At station Ii, as shown in FIG. 6, the already mentioned cam 20 produces the narrower cross-section in tube 2.

Finally, at station III electing means are provided, as for instance an ejector lever 34.

With such an assembly available, it is easy for the operator to cause the turret to rotate by 120°, at suitable operative time intervals so that, after having been cut at station I, tube 2 is moved to station II where, after having been connected to union 25, the various measurement operations are performed, and after having been disconnected from union 25, the same tube 2 is moved to station III where it is ejected, and so on.

Finally the result is a high speed operation without any possible contamination since each tube is ejected after utilization. In addition the assembly is preferably so arranged that blood or other product under test cannot reach union 25.

It is to be noted that the above specific description is assumed to apply to Quick tests involving plasma and thromboplastin which lasts from 5 seconds to 60 seconds. However this invention will also apply to other particularly longer tests as well, such as a heparin test. In a more general manner, it would apply to viscosity change detection for any substances.

Compared with prior art apparatus, embodiments according to this invention have many advantages. Particularly they are more accurate, they can be automatically operated in a minimum time and they are particularly simple and easy to operate.

While the principles of the present invention have hereabove been described in relation with specific embodiemnts, it must be clearly understood that the description has only been made by way of example and does not limit the scope of this invention.

What is claimed is:

1. A process for detecting sudden and substantial increases in fluid viscosity comprising the steps of:
   a. placing a sample of a fluid under test and a confined gas in a tube having a narrow cross-section;
   b. reciprocally moving said fluid through said narrow cross-section and thereby alternately compressing and expanding said confined gas;
   c. detecting the gas pressure variations, on one side of said sample, resulting from said alternate compression and expansion of said gas; and
   d. giving an output signal responsive to a pressure change which is substantially greater than the variations occurring responsive to said alternate compression and expansion.

2. The process of claim 1 wherein said fluid sample is blood plasma and said narrow cross-section is too smaall to pass an objectional blood clot.

3. Apparatus for detecting sudden and substantial increases in fluid viscosity, said apparatus comprising a sample tube for receiving a sample of a fluid under test and confining a gas, said tube having a narrow cross-section, means coupled through said gas for reciprocally moving said fluid sample through said narrow cross-section and thereby alternately compressisng and expanding said confined gas, means for detecting the pressure changes in the confined gas responsive to said reciprocally moving fluid, and means for indicating sudden and substantial pressure changes which exceed the variations occurring responsive to said reciprocally moving fluid.

4. The apparatus of claim 3 wherein said fluid sample is blood plasma and said narrow cross-section is too small to pass an objectional blood clot.

5. The apparatus of claim 3 wherein said fluid sample is subject to change in viscosity and said narrow cross-section is to small to enable free flow of the sample fluid after a predetermined increase in viscosity.

6. The apparatus of claim 3 and means for connecting said sample tube to a gas pump moving said confined gas, said gas being located between the gas pump and the sample tube fluid, and means for connecting the casing containing said gas to a manometer.

7. The apparatus according to claim 6, wherein the said gas pump is a syringe having a piston which is moved to-and-fro.

8. The apparatus according to claim 7 and a second syringe means connected to the outlet of the said gas pump syringe means for using the second syringe for pumping the sample fluid into the same sample tube, while the gas pump syringe is being utilized only for moving the fluid sample through the sample tube.

9. The apparatus according to claim 6, wherein said manometer is a maximum/minimum manometer in the form of a U-shaped tube containing mercury in the bight of the U, and two electric contact pins, each pin being located in a branch of the U-shaped tube and connected to an electric register, the volume of said mercury being adequate to make contact with said pins when it is displaced responsive to the excessive pressure change.

10. The apparatus according to claim 6, characterized by the fact that the said fluid is a mixture of blood plasma and a coagulation modifier, such as thromboplastin, and time register means for storing a first signal time when the blood plasma is mixed with the coagulation modifier and a second time signal when the excessive pressure increase is detected, the time interval from the first time signal to the second signal time indicating the blood plasma coagulation time.

11. The appratus according to claim 6, wherein said sample tube is a flexible plastic length of tubing and means for pressing the tubing to produce the narrow cross-section tube portion.

12. The apparatus according to claim 11, and a turret means having three grooves, each groove being shaped and dimensioned to receive a sample tube, means for rotating the turret with respect to three stations, the first of said stations comprising means for feeding a sample-tube the second of said stations comprising a pressure change detection station and the third of said stations comprising means for ejecting said sample tube, the three stations and the three grooves being respectively angularly spaced by 120° with respect to each other, the first station having means for feeding a length of sample tube into a groove and means for cutting a suitable length of sample tube, the second station having means for pumping the fluid into the sample tube, and means for detecting the said pressure change through means for connecting the sample tube to said moving and detecting means, and the third station comprising means for ejecting the sample tube.

* * * * *

UNITED STATES PATENT AND TRADEMARK OFFICE
CERTIFICATE OF CORRECTION

PATENT NO. : 3,911,728
DATED : October 14, 1975
INVENTOR(S) : Marcel Joseph Fixot It is certified that error appears in the above-identified patent and that said Letters Patent are hereby corrected as shown below:

Column 1, line 57, change "elctric" to --electric--

Column 2, line 18, change "to" to --of--

Column 2, line 22, change "as" to --a--

Column 2, line 39, change "sequency" to --sequence--

Column 3, line 9, change "clothing" to --clotting--

Column 3, line 11, after "and" insert --syringe--

Column 3, line 38, after "turn" insert --on--

Column 3, line 50, after "motor" insert --7 is--; insert a comma (,) after "operating"

Column 3, line 51, change "downward by" to --downwardly-- and "upward by" to --upwardly--

Column 3, line 65, change "upward by" to --upwardly--

Column 3, line 67, change "leftward by" to --leftwardly--

Column 4, line 6, change "downward" to --downwardly--

Column 4, line 8, change "rightward by" to --rightwardly--

Column 4, line 14, change "pose" to --pass--

UNITED STATES PATENT AND TRADEMARK OFFICE
CERTIFICATE OF CORRECTION

PATENT NO. : 3,911,728
DATED : October 14, 1975
INVENTOR(S) : Marcel Joseph Fixot It is certified that error appears in the above–identified patent and that said Letters Patent are hereby corrected as shown below:

Column 4, line 17, change "upward by" to --upwardly--

Column 5, line 7, change "above" to --able--

Column 5, line 48, after "30" insert --that stops the--

Column 6, line 5, change "Ii" to --II--

Column 6, line 57, change "smaall" to --small--

Column 6, line 65, change "compressisng" to --compressing--

Signed and Sealed this fourth Day of May 1976

[SEAL]

Attest:

RUTH C. MASON
*Attesting Officer*

C. MARSHALL DANN
*Commissioner of Patents and Trademarks*